US012518575B2

(12) United States Patent
Bandarra

(10) Patent No.: US 12,518,575 B2
(45) Date of Patent: Jan. 6, 2026

(54) SYSTEM AND METHOD FOR DYNAMICALLY IMPROVING VEHICLE DIAGNOSTIC SYSTEMS

(71) Applicant: Bayerische Motoren Werke Aktiengesellschaft, Munich (DE)

(72) Inventor: Marta Bandarra, Hallbergmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 223 days.

(21) Appl. No.: 17/917,648

(22) PCT Filed: Apr. 21, 2021

(86) PCT No.: PCT/EP2021/060438
§ 371 (c)(1),
(2) Date: Oct. 7, 2022

(87) PCT Pub. No.: WO2021/224010
PCT Pub. Date: Nov. 11, 2021

(65) Prior Publication Data
US 2023/0145354 A1 May 11, 2023

(30) Foreign Application Priority Data
May 6, 2020 (DE) .................. 10 2020 112 327.2

(51) Int. Cl.
*G07C 5/08* (2006.01)
(52) U.S. Cl.
CPC .......... *G07C 5/0808* (2013.01); *G07C 5/085* (2013.01); *B60W 2530/00* (2013.01)
(58) Field of Classification Search
CPC . G07C 5/0808; G07C 5/085; B60W 2530/00; B60W 50/06; B60W 50/0205;
(Continued)

(56) References Cited
U.S. PATENT DOCUMENTS

2003/0216889 A1* 11/2003 Marko ............... G07C 5/008
702/182
2007/0027951 A1* 2/2007 Motoyama ........... H04L 67/125
709/203
(Continued)

FOREIGN PATENT DOCUMENTS

DE         103 19 493 A1    11/2003
DE    10 2017 213 235 A1     2/2019
(Continued)

OTHER PUBLICATIONS

German Federal Highway Research Institute (BASt), "Rechtsfolgen zunehmender Fahrzeugautomatisierung", Forschung kompakt, Bundesanstalt fuer Strassenwesen, Edition Nov. 2012 with English Abstract (two (2) pages).
(Continued)

*Primary Examiner* — Aniss Chad
*Assistant Examiner* — Christine Nguyen Huynh
(74) *Attorney, Agent, or Firm* — Crowell & Moring LLP

(57) ABSTRACT

A system and method dynamically improve a vehicle diagnostic system in the vehicle in a simple way. The system includes at least one vehicle. The vehicle has an input unit designed to receive an input with respect to a vehicle error, and a control unit designed to create a snapshot of the electrical and/or electronic vehicle components after the input has been received by way of the input unit. The vehicle has a feedback unit designed to capture feedback regarding the vehicle error. The capturing of the feedback includes organizing the feedback in a predefined problem description structure. The feedback unit is designed to process the feedback and to derive a degree of severity of a problem from the feedback. The captured feedback is integrated into the snapshot. The vehicle has a communication unit designed to transmit the created snapshot to a back end.

6 Claims, 4 Drawing Sheets

(58) Field of Classification Search
CPC .. B60R 16/0232; B60Y 2306/15; H04L 67/12
See application file for complete search history.

(56) References Cited

U.S. PATENT DOCUMENTS

| | | | | |
|---|---|---|---|---|
| 2011/0046842 A1* | 2/2011 | Smith | ............. | G07C 5/006 |
| | | | | 701/31.4 |
| 2014/0279707 A1* | 9/2014 | Joshua | ............. | G06Q 30/0283 |
| | | | | 701/1 |
| 2014/0358356 A1* | 12/2014 | Jones | ............. | G07C 5/0866 |
| | | | | 701/32.7 |
| 2016/0328890 A1* | 11/2016 | Keane | ............. | G07C 5/008 |

FOREIGN PATENT DOCUMENTS

| | | | | |
|---|---|---|---|---|
| DE | 102017218094 A1 * | 4/2019 | ....... | G06Q 10/06315 |
| JP | 2014-201085 A | 10/2014 | | |

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

International Search Report (PCT/ISA/210) issued in PCT Application No. PCT/EP2021/060438 dated Jun. 25, 2021 with English translation (six (6) pages).

German-language Written Opinion (PCT/ISA/237) issued in PCT Application No. PCT/EP2021/060438 dated Jun. 25, 2021 (eight (8) pages).

German-language Search Report issued in German Application No. 10 2020 112 327.2 dated Feb. 22, 2021 with partial English translation (10 pages).

German-language European Office Action issued in European Application No. 21 721 060.8 dated Mar. 4, 2024 (16 pages).

Chinese-language Office Action issued in Chinese Application No. 202180026937.4 dated Feb. 14, 2025 with English translation (14 pages).

Korean-language Office Action issued in Korean Application No. 10-2022-7036093 dated Jan. 23, 2025 with English Translation (5 pages).

Chinese-language Office Action issued in Chinese Application No. 202180026937.4 dated May 30, 2025 with English translation (10 pages).

* cited by examiner

SYSTEM AND METHOD FOR DYNAMICALLY IMPROVING VEHICLE DIAGNOSTIC SYSTEMS

BACKGROUND AND SUMMARY

The present invention relates to a system and a method for dynamically improving vehicle diagnostic systems.

Vehicle diagnostic systems are known. These are systems which can comprise a large number of technical methods and applications in order to enable an accurate assignment of findings to faults appertaining to electrical and electronic components in the vehicle during fault analysis. What is disadvantageous about such diagnostic systems is that faults appertaining to electrical and electronic components are described with the aid of functions and a fault is only recognized if a predeterminable or predetermined threshold range is exceeded. In this case, a specific fault code or error code or diagnostic trouble code (DTC) is assigned to each fault. A further disadvantage is that only a known fault to which a specific fault code has already been assigned is actually recognized. This can have the effect that a customer perceives a malfunction in the vehicle, but this is not recognized as a fault by the vehicle diagnostic system because a threshold value is not exceeded and/or the fault is not recognized as such since no corresponding fault code exists.

The object of the invention is to provide a solution that enables improved, dynamic detection of faults in the vehicle and thus improves vehicle diagnostic systems.

This object is achieved according to the invention by means of the features of the independent claims. The dependent claims relate to preferred embodiments.

The abovementioned object is achieved by means of a system for simply and dynamically improving a vehicle diagnostic system comprising at least one vehicle, wherein the vehicle comprises:
  an input unit configured to receive an input with respect to a vehicle fault;
  a control unit configured to create a snapshot of the electrical and/or electronic vehicle components after the input has been received via the input unit; and
  a communication unit configured to communicate the created snapshot to a backend.

The system comprises at least one vehicle. In the context of this document, the term vehicle encompasses mobile means of transport that serve to transport persons (passenger traffic), goods (freight traffic) or tools (machines or implements). In particular, the term vehicle encompasses motor vehicles and motor vehicles which can be driven electrically at least in part (electric automobile, hybrid vehicles).

The vehicle can be controlled by a vehicle driver. In addition or as an alternative thereto, the vehicle can be an at least partially automated driving vehicle. In the context of this document, the term "automated driving vehicle" or "automated driving" can be understood to mean driving with automated longitudinal or lateral control or autonomous driving with automated longitudinal and lateral control. Automated driving can involve for example driving for a relatively long time on the interstate or driving for a limited time in the context of parking or maneuvering. The term "automated driving" encompasses automated driving with an arbitrary degree of automation. Exemplary degrees of automation are assisted, partly automated, highly automated or fully automated driving. These degrees of automation were defined by the German Federal Highway Research Institute (BASt) (see BASt publication "Research compact", issue November 2012). In the case of assisted driving, the driver permanently carries out the longitudinal or lateral control, while the system performs the respective other function within certain limits. In the case of partly automated driving, the system performs the longitudinal and lateral control for a certain period of time and/or in specific situations, wherein the driver must permanently monitor the system as in the case of assisted driving. In the case of highly automated driving, the system performs the longitudinal and lateral control for a certain period of time, without the driver having to permanently monitor the system. However, the driver must be able to take over control of the vehicle within a certain time. In the case of fully automated driving, the system can automatically manage driving in all situations for a specific application; a driver is no longer required for this application. The four degrees of automation mentioned above correspond to SAE levels 1 to 4 of the SAE J3016 standard (SAE—Society of Automotive Engineering). Furthermore, SAE J3016 also provides SAE level 5 as the highest degree of automation, which is not contained in the definition by the BASt. SAE level 5 corresponds to driverless driving, wherein the system can automatically manage all situations like a human driver during the entire journey.

The vehicle comprises an input unit. The input unit can be part of an infotainment system of the vehicle, for example. The input unit can be operated by means of voice control and/or touch operation and/or key operation and/or any other operating option. The input unit is configured to receive an input with respect to a vehicle fault. By way of example, when a vehicle fault with respect to an electronic and/or electrical component of the vehicle is recognized, a user of the vehicle can effect an input with respect to the vehicle fault via the input unit. This can be done in a very convenient way. For example, an application or app preinstalled in the vehicle can be provided, by means of which the recognized vehicle fault can be input by voice input and/or touch input via a touchscreen and/or some other suitable input.

The vehicle comprises a control unit. The control unit is configured to create a snapshot of the electrical and/or electronic vehicle components after the input with respect to the vehicle fault has been received via the input unit. The snapshot can be a suitable data structure and can comprise a current state of the electrical and/or electronic vehicle components at the time when the input with respect to the vehicle fault was received via the input unit. This is particularly advantageous since the user of the vehicle may not have any information about the electrical and/or electronic component(s) responsible for the perceived vehicle fault. A snapshot of all the electrical and/or electronic vehicle components at the time when the vehicle fault was perceived by the user of the vehicle is thus created, which can be analyzed later in the procedure. The electrical and/or electronic components of the vehicle can comprise the entire vehicle or automobile electronics, that is to say the entire area of the electronics in the vehicle. These can include all control devices that are distributed in the vehicle. The control devices can include control devices with respect to the instrument cluster in the vehicle, with respect to the engine controller in the vehicle, with respect to driver assistance systems in the vehicle, with respect to airbag systems in the vehicle, with respect to alarm systems in the vehicle, with respect to multimedia systems in the vehicle, etc.

The vehicle comprises a feedback unit. The feedback unit is configured to acquire feedback about the vehicle fault;
  wherein acquiring the feedback comprises categorizing the feedback in a predefined problem description structure;

wherein the feedback unit is configured to process the feedback and to derive a degree of severity of a problem from the feedback;
and wherein the acquired feedback is integrated into the snapshot.

The vehicle can additionally comprise a feedback unit or a feedback module. The feedback unit is configured to acquire further information or data with respect to the vehicle fault from the user or driver of the vehicle. By way of example, a predefined dialog can be carried out via an input and output unit in the vehicle, for example the infotainment system of the vehicle. It is thus possible to capture further disturbances, perceived in particular by the user or driver of the vehicle, with respect to the perceived vehicle fault. The feedback acquired by the feedback unit or the feedback data acquired by the feedback unit can be integrated into the snapshot.

By way of example, the feedback unit can comprise a voice dialog system in order to include the feedback from the user or driver of the vehicle with respect to the perceived disturbance with respect to the perceived vehicle fault. In the context of this document, a voice dialog system is a system via which persons can conduct dialogs in natural language and thus use natural language as an input and/or output medium. Acquiring the feedback via the voice dialog system, which can be part of the infotainment system of the vehicle, is particularly advantageous since the feedback can be obtained without the user or driver of the vehicle having to use operating elements to input the feedback. This prevents the user or driver of the vehicle from being distracted from road traffic. In addition, or as an alternative thereto, the feedback unit can comprise an input and output unit that can be part of the infotainment system of the vehicle. Feedback about the vehicle fault can be acquired here for example by touch input, input via an operating element, etc., via a window.

Acquiring the feedback can comprise categorizing the feedback in a predefined or predefinable problem description structure. The problem description structure can comprise one or more of the following elements:
location or part of the vehicle where the problem is perceived, e.g. brakes, transmission, etc.
signs or clues with respect to the problem, e.g. smoke development, noises, etc.
circumstances or conditions under which the problem occurs, e.g. when starting the engine, during a braking process, etc.
frequency of occurrence of the problem.

From the processing of the feedback, the feedback unit can derive the severity or degree of severity of the problem, wherein the degree of severity can be classified in different areas, e.g. severe if the wellbeing of the vehicle occupants and/or of other road users is affected, or slight if a disruption of the traffic situation information in the navigation module of the vehicle is involved.

Examples of the provision of feedback by a user or driver of the vehicle via a voice dialog system in the event of a problem with respect to traffic situation information can be:
"There is a road closure that was not indicated";
"Why was this road closure not indicated";
"Why was this accident not indicated";
"Why didn't you foresee this accident"; etc.

Examples of the provision of feedback by a user or driver of the vehicle via a voice dialog system with respect to a mechanical problem can be:
"Whenever I start the vehicle, it makes strange noises";
"Whenever I start the engine, I hear strange noises";
"Whenever I stop the vehicle, the engine makes knocking noises";
"Whenever I turn off the engine, the engine makes knocking noises";
"The engine sometimes makes rattling noises while driving"; etc.

In this regard, the feedback unit can derive the following from the feedback "Whenever I turn off the engine, the engine makes knocking noises":
Location or part of the vehicle where the problem is perceived: engine;
Signs or clues with respect to the problem: knocking noises;
Circumstances or conditions under which the problem occurs: when the engine stops;
Frequency of occurrence of the problem: every time the engine stops;
Degree of severity of the problem: moderate problem, a workshop should be visited soon.

Analogously to the aforementioned example, problem descriptions input via other input options can also be classified by the feedback unit.

Advantageously, in addition to the technical state data of the electrical and/or electronic components of the vehicle, the disturbance perceived by the user or driver of the vehicle with respect to the vehicle fault can thus be acquired, integrated into the snapshot and concomitantly communicated to the backend for possible fault diagnosis. The perception of the user or driver of the vehicle with respect to the vehicle fault affords a significant advantage when identifying the vehicle fault and/or the causes of the vehicle fault in comparison with conventional vehicle diagnostic systems. By classifying the feedback via the feedback unit, it is possible to realize a uniform data structure for problem description and to communicate it to the backend for possible fault diagnosis. Advantageously, the snapshot and the feedback can thus be combined or merged into a uniform overall data structure.

The system comprises a backend. The backend can comprise at least one backend server and/or be part of cloud computing or of an IT infrastructure that provides storage space, computing power and/or application software as a service via the internet (service provider).

The vehicle comprises a communication unit. The communication unit can be a communication unit which is arranged in the vehicle and which is configured to establish a communication connection to other communication subscribers, for example the backend and/or a mobile terminal. The communication unit can comprise a subscriber identity module or a SIM card, which serves to establish a communication connection via a mobile radio system. In this case, the subscriber identity module uniquely identifies the communication unit in the mobile radio network. The communication connection can be a data connection (e.g. packet switching) and/or a wired communication connection (e.g. circuit switching). The communication can take place according to the Cellular Vehicle To X (C-V2X) Paradigm in accordance with the LTE Standard Version 14, the 4G Standard and/or the 5G Standard. Furthermore, the communication unit can communicate via another air interface, for example WLAN, independently of the mobile radio network or the availability of sufficient capacities of the currently available mobile radio network. For this purpose, it is possible to use IST-G5 or IEEE 802.11p during vehicle-to-vehicle (V2V) communication. Via the communication unit, the vehicle can thus receive data from other communication subscribers or communicate data to other communication subscribers.

The communication unit is configured to communicate the created snapshot to the backend.

Advantageously, data with respect to a vehicle fault recognized or perceived by a user of a vehicle can thus be acquired independently of defined or undefined fault codes for one or more electronic and/or electrical vehicle components and independently of whether a threshold value required for a defined fault code is exceeded, and can be communicated to the backend for further fault detection or fault processing. Known vehicle diagnostic systems are considerably improved as a result since they often do not recognize fault states, even though a vehicle user perceives a fault or fault state. This increases the safety of all road users in road traffic, in particular.

Preferably, the snapshot of the electrical and/or electronic vehicle components comprises:
  a current status of all the electrical and/or electronic vehicle components; and/or
  a vehicle identification number of the vehicle; and/or
  a battery status of the vehicle; and/or
  a maintenance history of the vehicle; and/or
  a geographical position of the vehicle; and/or
  current environmental conditions of the vehicle; and/or
  a current odometer reading of the vehicle; and/or
  the feedback about the vehicle fault; and/or
  a time stamp of the time of the input received via the input unit; and/or
  a software version installed and executed in the vehicle or in the electrical and/or electronic vehicle components of the vehicle.

The current status of all the electrical and/or electronic vehicle components includes in particular a current status thereof at the time of the input received.

The vehicle identification number (VIN) of the vehicle can be used to identify the relevant vehicle during further processing of the snapshot, for example by the backend and/or by service employees.

The geographical position of the vehicle can be determined for example by a position determining unit installed in the vehicle. The position determining unit can be configured to determine or capture current position data of the vehicle with the aid of a navigation satellite system. The navigation satellite system can be any conventional and future global navigation satellite system (GNSS) for position determination and navigation by reception of signals from navigation satellites and/or pseudolites. This can involve for example the Global Positioning System (GPS), GLObal NAvigation Satellite System (GLONASS), Galileo positioning system and/or BeiDou Navigation Satellite System. In the example of GPS, the position determining unit can comprise a GPS module configured to determine current GPS position data of the vehicle at the time of the input via the input unit.

Current environmental conditions can comprise for example a current outside temperature, current weather conditions, road conditions, etc. These can be acquired in the manner known from the prior art with the aid of suitable sensors (e.g. temperature sensor, rain sensor, external cameras, etc.) at the time of the input via the input unit and can be integrated into the snapshot.

The backend is preferably configured to evaluate the received snapshot.

The received snapshot can be evaluated by the backend with the aid of suitable machine learning algorithms. By way of example, with the aid of models created by machine learning methods—e.g. by means of supervised learning or unsupervised learning—from a large number of vehicles from the snapshots already received, one or more electronic and/or electrical components responsible for the vehicle fault can be identified. In addition or as an alternative thereto—for example for the case where no electronic and/or electrical component(s) unambiguously responsible for the vehicle fault can be determined—the snapshot can be communicated to a service employee or tele-assistance employee. The latter, in order to obtain further information with respect to the vehicle fault, for example, may contact the user of the vehicle and/or propose a service appointment for the vehicle. In addition or as an alternative thereto, the snapshot data can also be used by workshops and/or problem management teams in order to find solutions to problems. Advantageously, external service employees can thus also benefit from the snapshot. Consequently, not only can the vehicle fault be dealt with promptly and individually, but a direct communication channel to the user of the vehicle can also be established. Accumulating the acquired snapshots at the backend makes it possible—for example with the aid of suitable algorithms—to identify patterns, thus affording the possibility of technical improvement for a large number of vehicles. In this regard, in the case of a vehicle fault identified in this way, this affords the possibility of identifying further vehicles potentially affected by the vehicle fault, in which, for example, the vehicle fault can be rectified by a targeted software update.

In accordance with a second aspect, the underlying object is achieved by means of a method for simply and dynamically improving a vehicle diagnostic system, comprising:
  receiving via an input unit of a vehicle, an input with respect to a vehicle fault;
  creating, via a control unit of the vehicle, a snapshot of the electrical and/or electronic vehicle components;
  acquiring, via a feedback unit of the vehicle, feedback about the vehicle fault;
  wherein acquiring the feedback comprises categorizing the feedback in a predefined problem description structure;
  wherein the feedback unit is configured to process the feedback and to derive a degree of severity of a problem from the feedback;
  integrating the acquired feedback into the snapshot; and
  communicating, via a communication unit of the vehicle, the created snapshot to a backend.

Preferably, the snapshot of the electrical and/or electronic vehicle components comprises:
  a current status of all the electrical and/or electronic vehicle components; and/or
  a vehicle identification number of the vehicle; and/or
  a battery status of the vehicle; and/or
  a maintenance history of the vehicle; and/or
  a geographical position of the vehicle; and/or
  current environmental conditions of the vehicle; and/or
  a current odometer reading of the vehicle; and/or
  the feedback about the vehicle fault; and/or
  a time stamp of the time of the input received via the input unit; and/or
  a software version installed and executed in the vehicle or in the electrical and/or electronic vehicle components of the vehicle.

The backend is preferably configured to evaluate the received snapshot.

These and other objects, features and advantages of the present invention will be clarified from study of the follow-

DETAILED DESCRIPTION OF THE DRAWINGS

Figure 1:
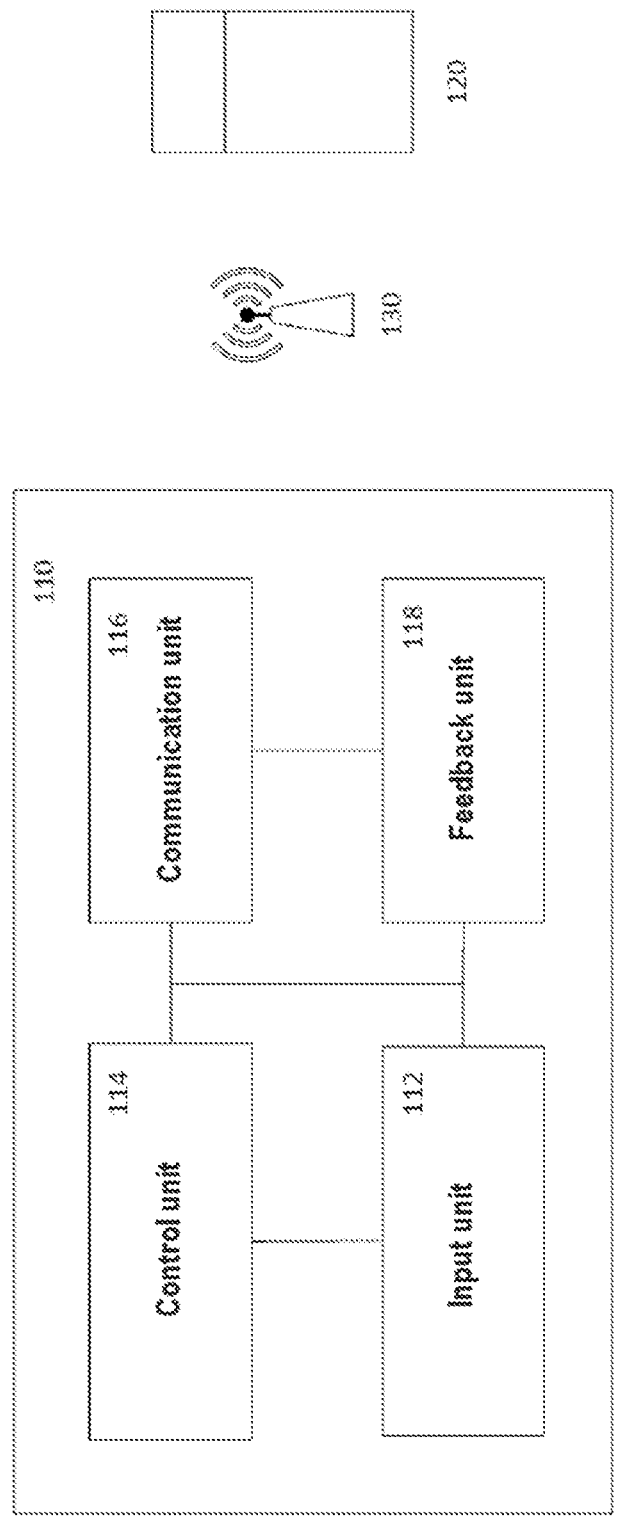
FIG. 1 schematically shows a system for simply and dynamically improving a vehicle diagnostic system.

FIG. 1 schematically shows a system 100 for simply and dynamically improving a vehicle diagnostic system in the vehicle 110.

The system 100 comprises at least one vehicle 110. The vehicle 110 comprises an input unit 112. The input unit 112 can be part of an infotainment system of the vehicle 110, for example. The input unit 112 can be operated by means of voice control and/or touch operation and/or key operation and/or any other operating option. The input unit 112 is configured to receive an input with respect to a vehicle fault. By way of example, when a vehicle fault with respect to an electronic and/or electrical component of the vehicle 110 is recognized, a user of the vehicle 110 can effect an input with respect to the vehicle fault via the input unit 112. This can be done in a very convenient way. For example, an application or app preinstalled in the vehicle can be provided, by means of which the recognized vehicle fault can be input by voice input and/or touch input via a touchscreen and/or some other suitable input.

The vehicle 110 comprises a control unit 114. The control unit 114 is configured to create a snapshot 300 of the electrical and/or electronic vehicle components after the input with respect to the vehicle fault has been received via the input unit 112. The snapshot 300 can be a suitable data structure and can comprise a current state of the electrical and/or electronic vehicle components at the time when the input with respect to the vehicle fault was received via the input unit 112. This is particularly advantageous since the user of the vehicle 110 may not have any information about the electrical and/or electronic component(s) responsible for the perceived vehicle fault. A snapshot 300 of all the electrical and/or electronic vehicle components at the time when the vehicle fault was perceived by the user of the vehicle 110 is thus created, which can be analyzed later in the procedure. The electrical and/or electronic components of the vehicle 110 can comprise the entire vehicle or automobile electronics, that is to say the entire area of the electronics in the vehicle 110. These can include all control devices that are distributed in the vehicle 110. The control devices can include control devices with respect to the instrument cluster in the vehicle 110, with respect to the engine controller in the vehicle 110, with respect to driver assistance systems in the vehicle 110, with respect to airbag systems in the vehicle, with respect to alarm systems in the vehicle 110, with respect to multimedia systems in the vehicle, etc.

The vehicle 110 can additionally comprise a feedback unit 118. The feedback unit 118 is configured to acquire further information or data with respect to the vehicle fault from the user or driver of the vehicle 110, as explained in greater detail further below with reference to FIG. 4. By way of example, a predefined dialog can be carried out via an input and output unit 112 in the vehicle 110, for example the infotainment system of the vehicle 110. It is thus possible to capture further disturbances, perceived in particular by the user or driver of the vehicle 110, with respect to the perceived vehicle fault. The feedback acquired by the feedback unit 118 or the feedback data acquired by the feedback unit can be integrated into the snapshot 300.

By way of example, the feedback unit 118 can comprise a voice dialog system in order to include the feedback from the user or driver of the vehicle 110 with respect to the perceived disturbance with respect to the perceived vehicle fault. In the context of this document, a voice dialog system is a system via which persons can conduct dialogs in natural language and thus use natural language as an input and/or output medium. Acquiring the feedback via the voice dialog system, which can be part of the infotainment system of the vehicle 110, is particularly advantageous since the feedback can be obtained without the user or driver of the vehicle having to use operating elements to input the feedback. This prevents the user or driver of the vehicle from being distracted from road traffic. In addition, or as an alternative thereto, the feedback unit 118 can comprise an input and output unit that can be part of the infotainment system of the vehicle 110. Feedback about the vehicle fault can be acquired here for example by touch input, input via an operating element, etc., via a window.

Acquiring the feedback can comprise categorizing the feedback in a predefined or predefinable problem description structure via the feedback unit 118. The problem description structure can comprise one or more of the following elements:

location or part of the vehicle where the problem is perceived, e.g. brakes, transmission, etc.

signs or clues with respect to the problem, e.g. smoke development, noises, etc.

circumstances or conditions under which the problem occurs, e.g. when starting the engine, during a braking process, etc.

frequency of occurrence of the problem.

From the processing of the feedback, the feedback unit 118 can derive the severity or degree of severity of the problem, wherein the degree of severity can be classified in different areas, e.g. severe if the wellbeing of the vehicle occupants and/or of other road users is affected, or slight if a disruption of the traffic situation information in the navigation module of the vehicle 110 is involved.

Examples of the provision of feedback by a user or driver of the vehicle 110 via a voice dialog system in the event of a problem with respect to traffic situation information can be:

"There is a road closure that was not indicated";

"Why was this road closure not indicated";

"Why was this accident not indicated";

"Why didn't you foresee this accident"; etc.

Examples of the provision of feedback by a user or driver of the vehicle 110 via a voice dialog system with respect to a mechanical problem can be:

"Whenever I start the vehicle, it makes strange noises";

"Whenever I start the engine, I hear strange noises";

"Whenever I stop the vehicle, the engine makes knocking noises";

"Whenever I turn off the engine, the engine makes knocking noises";

"The engine sometimes makes rattling noises while driving"; etc.

In this regard, the feedback unit 118 can derive the following from the feedback "Whenever I turn off the engine, the engine makes knocking noises":

Location or part of the vehicle where the problem is perceived: engine;
Signs or clues with respect to the problem: knocking noises;
Circumstances or conditions under which the problem occurs: when the engine stops;
Frequency of occurrence of the problem: every time the engine stops;
Degree of severity of the problem: moderate problem, a workshop should be visited soon.

Analogously to the aforementioned example, problem descriptions input via other input options can also be classified by the feedback unit 118.

Advantageously, in addition to the technical state data of the electrical and/or electronic components of the vehicle 110, the disturbance perceived by the user or driver of the vehicle 110 with respect to the vehicle fault can thus be acquired, integrated into the snapshot 300 and concomitantly communicated to a backend 120 (see below) for possible fault diagnosis. The perception of the user or driver of the vehicle with respect to the vehicle fault affords a significant advantage when identifying the vehicle fault and/or the causes of the vehicle fault in comparison with conventional vehicle diagnostic systems. By classifying the feedback via the feedback unit 118, it is possible to realize a uniform data structure for problem description and to communicate it to the backend 120 for possible fault diagnosis. Advantageously, the snapshot 300 and the feedback can thus be combined or merged into a uniform overall data structure.

The snapshot 300 of the electrical and/or electronic vehicle components can comprise:

a current status 301 of all the electrical and/or electronic vehicle components; and/or
a vehicle identification number (VIN) 302 of the vehicle 110; and/or
a battery status 303 of the vehicle 110; and/or
a maintenance history 304 of the vehicle 110; and/or
a geographical position 305 of the vehicle 110; and/or
current environmental conditions 306 of the vehicle 110; and/or
a current odometer reading 307 of the vehicle 110; and/or
the feedback about the vehicle fault 308; and/or
a time stamp 309 of the time of the input received via the input unit 112 of the vehicle 110; and/or
a software version 310 installed and executed in the vehicle 110 or in the electrical and/or electronic vehicle components of the vehicle.

The current status 301 of all the electrical and/or electronic vehicle components includes in particular a current status thereof at the time of the input received with respect to the vehicle fault.

The vehicle identification number (VIN) 302 of the vehicle 110 can be used to identify the relevant vehicle during further processing of the snapshot, for example by the backend 120 and/or by service employees.

The geographical position 305 of the vehicle 110 can be determined for example by a position determining unit (not shown) installed in the vehicle. The position determining unit can be configured to determine or capture current position data of the vehicle 110 with the aid of a navigation satellite system. The navigation satellite system can be any conventional and future global navigation satellite system (GNSS) for position determination and navigation by reception of signals from navigation satellites and/or pseudolites. This can involve for example the Global Positioning System (GPS), GLObal NAvigation Satellite System (GLONASS), Galileo positioning system and/or BeiDou Navigation Satellite System. In the example of GPS, the position determining unit can comprise a GPS module configured to determine current GPS position data of the vehicle 110 at the time of the input via the input unit 112.

Current environmental conditions 306 can comprise for example a current outside temperature, current weather conditions, road conditions, etc. These can be acquired in the manner known from the prior art with the aid of suitable sensors (e.g. temperature sensor, rain sensor, external cameras, etc.) at the time of the input via the input unit 112 and can be integrated into the snapshot 300.

An exemplary snapshot 300 is explained in greater detail further below with reference to FIG. 3.

The system 100 comprises a backend 120. The backend 120 can comprise at least one backend server and/or be part of cloud computing or of an IT infrastructure that provides storage space, computing power and/or application software as a service via the internet (service provider).

The vehicle 110 comprises a communication unit 116. The communication unit 116 can be a communication unit 116 which is arranged in the vehicle 110 and which is configured to establish a communication connection to other communication subscribers, for example the backend 120 and/or a mobile terminal. The communication unit 116 can comprise a subscriber identity module or a SIM card, which serves to establish a communication connection via a mobile radio system. In this case, the subscriber identity module uniquely identifies the communication unit 116 in the mobile radio network. The communication connection can be a data connection (e.g. packet switching) and/or a wired communication connection (e.g. circuit switching). The communication can take place according to the Cellular Vehicle To X (C-V2X) Paradigm in accordance with the LTE Standard Version 14, the 4G Standard and/or the 5G Standard. Furthermore, the communication unit 116 can communicate via another air interface, for example WLAN, independently of the mobile radio network or the availability of sufficient capacities of the currently available mobile radio network. For this purpose, it is possible to use IST-G5 or IEEE 802.11p during vehicle-to-vehicle (V2V) communication. Via the communication unit 116, the vehicle can thus receive data from other communication subscribers or communicate data to other communication subscribers.

The communication unit 116 is configured to communicate the created snapshot to the backend 120.

Advantageously, data with respect to a vehicle fault recognized or perceived by a user of a vehicle 110 can thus be acquired independently of defined or undefined fault codes for one or more electronic and/or electrical vehicle components and independently of whether a threshold value required for a defined fault code is exceeded, and can be communicated to the backend 120 for further fault detection or fault processing. Known vehicle diagnostic systems are considerably improved as a result since they often do not recognize fault states, even though a vehicle user perceives a fault or fault state. This increases the safety of all road users in road traffic, in particular.

The backend 120 can be configured to evaluate the received snapshot.

The received snapshot can be evaluated by the backend 120 with the aid of suitable machine learning algorithms. By way of example, with the aid of models created by machine learning methods—e.g. by means of supervised learning or unsupervised learning—from a large number of vehicles 110 from the snapshots 300 already received, one or more electronic and/or electrical components responsible for the vehicle fault can be identified. In addition or as an alternative thereto—for example for the case where no electronic and/or electrical component(s) unambiguously responsible for the vehicle fault can be determined—the snapshot 300 can be communicated to a service employee or tele-assistance employee. The latter, in order to obtain further information with respect to the vehicle fault, for example, may contact the user of the vehicle 110 and/or propose a service appointment for the vehicle 110. In addition or as an alternative thereto, the snapshot data can also be used by workshops and/or problem management teams in order to find solutions to problems. Advantageously, external service employees can thus also benefit from the snapshot. Consequently, not only can the vehicle fault be dealt with promptly and individually, but a direct communication channel to the user of the vehicle 110 can also be established. Accumulating the acquired snapshots at the backend 120 makes it possible—for example with the aid of suitable algorithms—to identify patterns, thus affording the possibility of technical improvement for a large number of vehicles 110. In this regard, in the case of a vehicle fault identified in this way, this affords the possibility of identifying further vehicles 110 potentially affected by the vehicle fault, in which, for example, the vehicle fault can be rectified by a targeted software update.

Figure 2:
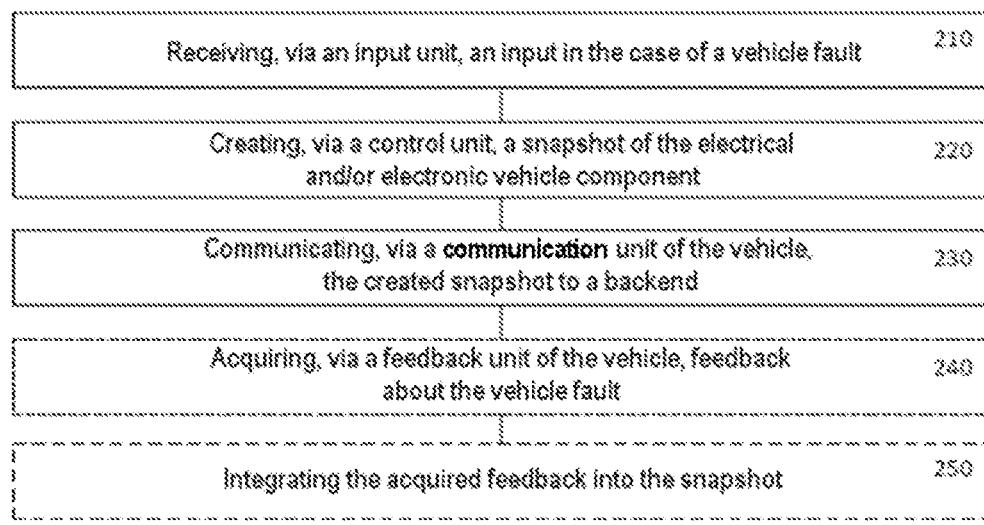
FIG. 2 shows an exemplary method for simply and dynamically improving a vehicle diagnostic system.

FIG. 2 shows a method 200 for simply and dynamically improving a vehicle diagnostic system that can be implemented by a system 100 as described with reference to FIG. 1.

The method 200 comprises:
receiving 210 via an input unit 112 of a vehicle 110, an input with respect to a vehicle fault;
creating 220, via a control unit 114 of the vehicle 110, a snapshot 300 of the electrical and/or electronic vehicle components;
acquiring 240, via a feedback unit 118 of the vehicle 110, feedback about the vehicle fault;
wherein acquiring the feedback comprises categorizing the feedback in a predefined problem description structure;
wherein the feedback unit 118 is configured to process the feedback and to derive a degree of severity of a problem from the feedback; and
integrating 250 the acquired feedback into the snapshot 300; and
communicating 230, via a communication unit 116 of the vehicle 110, the created snapshot 300 to a backend 120.

The snapshot 300 of the electrical and/or electronic vehicle components can comprise:
a current status 301 of all the electrical and/or electronic vehicle components; and/or
a vehicle identification number 302 of the vehicle 110; and/or
a battery status 303 of the vehicle 110; and/or
a maintenance history 304 of the vehicle 110; and/or
a geographical position 305 of the vehicle 110; and/or
current environmental conditions 306 of the vehicle 110; and/or
a current odometer reading 307 of the vehicle 110; and/or
the feedback 308 about the vehicle fault; and/or
a time stamp 309 of the time of the input received via the input unit 112; and/or
a software version 310 installed and executed in the vehicle 110 or in the electrical and/or electronic vehicle components of the vehicle 110.

The backend 120 can be configured to evaluate the received snapshot 300.

Figure 3:
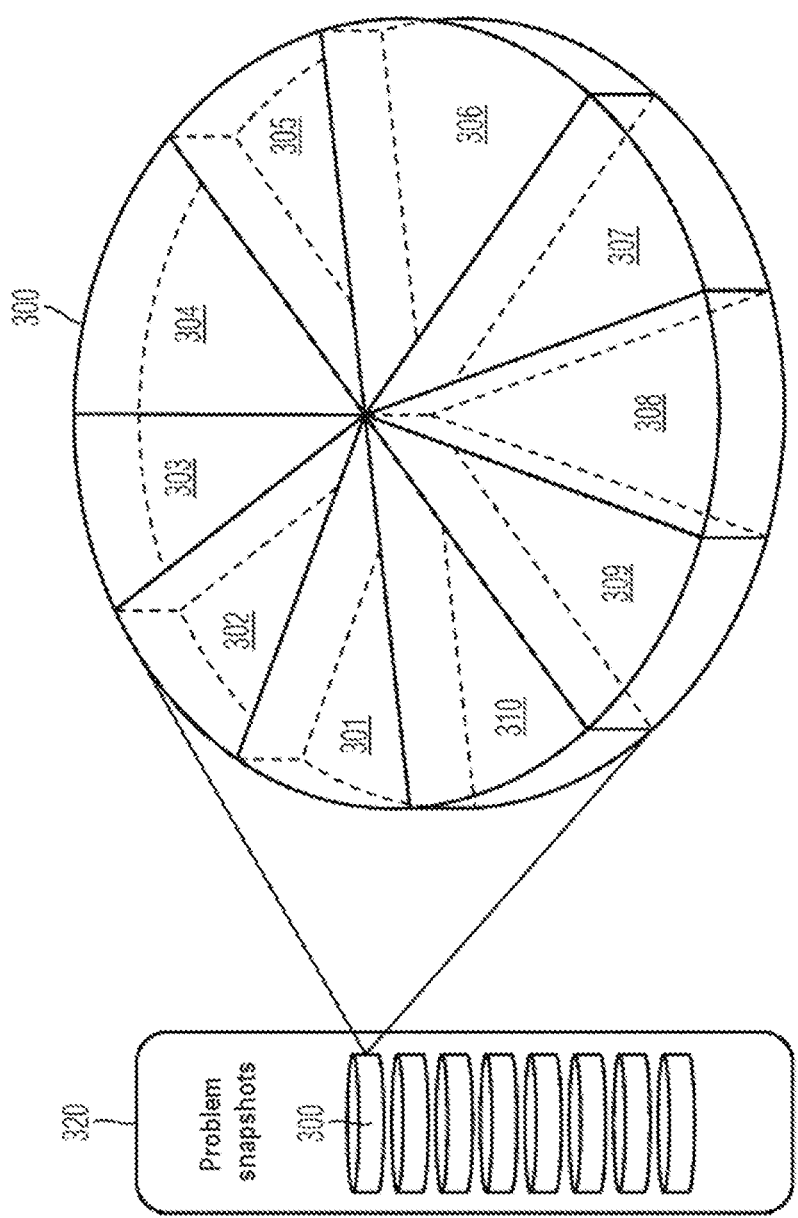
FIG. 3 shows an exemplary snapshot.

FIG. 3 shows an exemplary snapshot 300 as described with reference to FIGS. 1 and 2.

The exemplary snapshot 300 comprises a current status 301 of all the electrical and/or electronic vehicle components, a vehicle identification number 302 of the vehicle 110, a battery status 303 of the vehicle 110, a maintenance history 304 of the vehicle 110, a geographical position 305 of the vehicle 110, current environmental conditions 306 of the vehicle 110, a current odometer reading 307 of the vehicle 110, the feedback 308 about the vehicle fault, a time stamp 309 of the time of the input received via the input unit 112, and a software version 310 installed and executed in the vehicle 110 or in the electrical and/or electronic vehicle components of the vehicle 110.

The snapshot 300 is stored together with further (problem) snapshots of the vehicle 110 and/or of a large number of further vehicles in a storage unit 320. The backend 120 can comprise or access the storage unit 320 in order to process the snapshot(s) as described with reference to FIG. 1.

Figure 4:
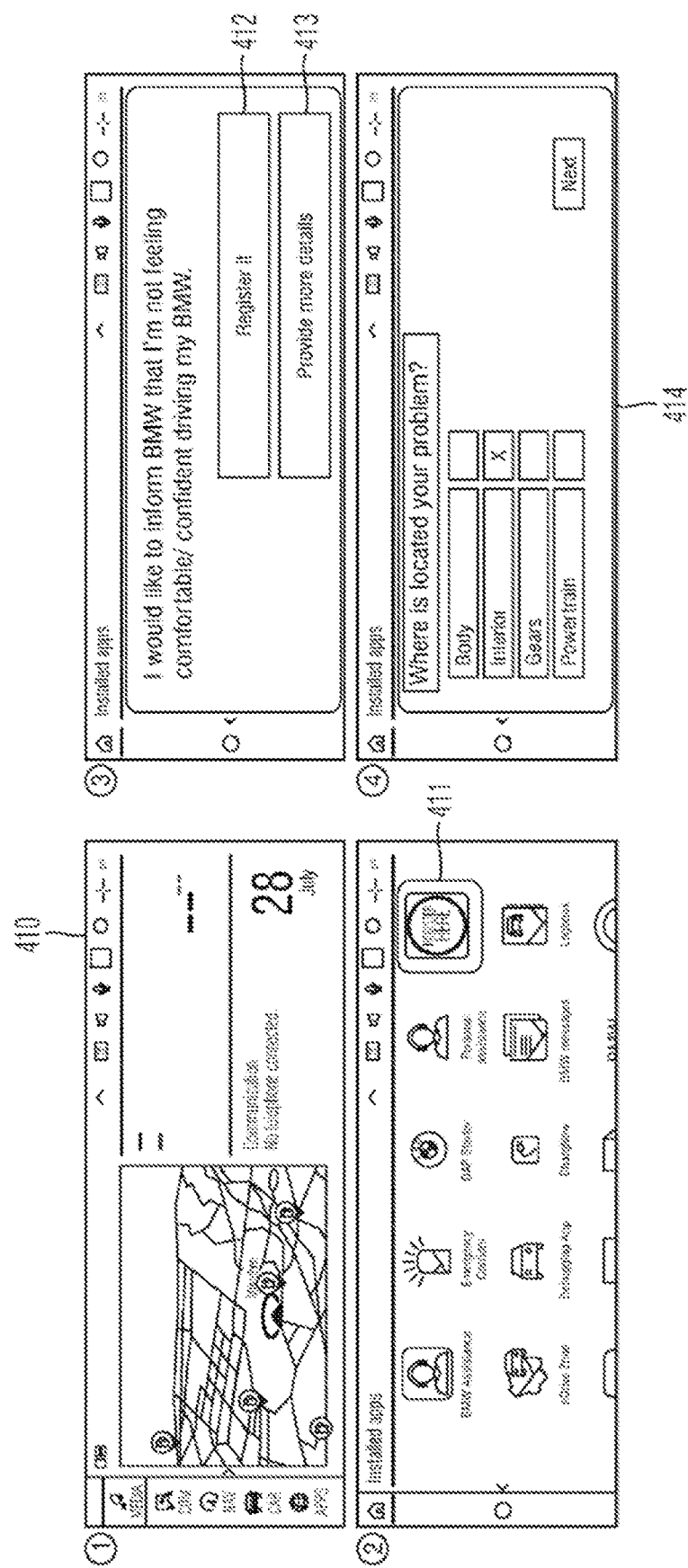
FIG. 4 shows by way of example an input with respect to a vehicle fault and feedback with respect to the vehicle fault.

FIG. 4 shows by way of example an input with respect to a vehicle fault and feedback with respect to the vehicle fault, as described with reference to FIGS. 1 and 2. The captured feedback can be classified by the feedback unit 118 as described with reference to FIG. 1 and can be merged together with the snapshot 300 to form a single, uniform data structure.

Window 410 shows an input and output unit 112 of the vehicle 110, which unit can constitute the infotainment system of the vehicle. Window 420 shows an area in which apps preinstalled in the vehicle 110 are displayed via the input and output unit 112. These include an app 411 used for input with respect to the vehicle fault—as described with reference to FIG. 1.

After the app 411 has been activated—for example by voice input, touch input, input via an operating element, etc.—window 412 is opened. The snapshot 300 is created by activation of the possible input 412 "Register it" (by means of one of the suitable input options mentioned above). This enables the user of the vehicle to report a vehicle fault in a particularly rapid, efficient and uncomplicated manner.

By activation of the possible input 413 "Provide more details" (by means of one of the suitable input options mentioned above), the feedback unit 118 is activated in order to acquire feedback about the vehicle fault, as described with reference to FIG. 1. In this case, further information is requested, starting with the query as to where in the vehicle the problem occurred. The obtaining of feedback can be extended in a flexible manner.

The invention claimed is:

1. A system for dynamically improving a vehicle diagnostic system, comprising:
at least one vehicle, wherein the vehicle comprises a plurality of at least one of electrical or electronic components that comprise:
an input unit configured to receive an input with respect to a vehicle fault;
a control unit configured to communicate with the electrical and/or electronic vehicle components of the vehicle and create a snapshot of the electrical and/or electronic vehicle components of the vehicle after the input has been received via the input unit, wherein the snapshot is created independently of defined or undefined fault codes of the at least one of electrical or electronic components and independent of whether a threshold value required for a defined fault code is exceeded;

a feedback unit, wherein the feedback unit is configured to acquire feedback about the vehicle fault;

wherein acquiring feedback comprises receiving feedback regarding the vehicle fault from a user via a voice dialog system of the feedback unit configured to receive feedback from the user in natural language;

wherein acquiring the feedback comprises categorizing the feedback in a predefined problem description structure;

wherein the feedback unit is configured to process the feedback and to derive a degree of severity of a problem from the feedback; and wherein the acquired feedback is integrated into the snapshot; and a communication unit configured to communicate the created snapshot to a backend.

2. The system according to claim 1, wherein the snapshot of the electrical and/or electronic vehicle components comprises at least one of:

a current status of all the electrical and/or electronic vehicle components;
a vehicle identification number of the vehicle;
a battery status of the vehicle;
a maintenance history of the vehicle;
a geographical position of the vehicle;
current environmental conditions of the vehicle;
a current odometer reading of the vehicle;
the feedback about the vehicle fault;
a time stamp of the time of the input received via the input unit; or
a software version installed and executed in the vehicle or in the electrical and/or electronic vehicle components of the vehicle.

3. The system according to claim 1, wherein the backend is configured to evaluate the received snapshot.

4. A method for dynamically improving a vehicle diagnostic system, comprising:

receiving, via an input unit of a vehicle, an input with respect to a vehicle fault;

creating, via a control unit of the vehicle, a snapshot of electrical and/or electronic vehicle components of the vehicle, based on communications with the electrical and/or electronic vehicle components of the vehicle, after the input has been received via the input unit, wherein the snapshot is created independently of defined or undefined fault codes of the at one of electrical or electronic components and independent of whether a threshold value required for a defined fault code is exceeded;

acquiring, via a feedback unit of the vehicle, feedback about the vehicle fault, wherein:

acquiring feedback comprises receiving feedback regarding the vehicle fault from a user via a voice dialog system of the feedback unit configured to receive feedback from the user in natural language;

acquiring the feedback comprises categorizing the feedback in a predefined problem description structure; and the feedback unit is configured to process the feedback and to derive a degree of severity of a problem from the feedback;

integrating, via the feedback unit of the vehicle, the acquired feedback into the snapshot; and communicating, via a communication unit of the vehicle, the created snapshot to a backend;

wherein the input unit, the control unit, the feedback unit, and the communication unit are at least one of an electrical or electronic component of the vehicle.

5. The method according to claim 4, wherein the snapshot of the electrical and/or electronic vehicle components comprises at least one of:

a current status of all the electrical and/or electronic vehicle components;
a vehicle identification number of the vehicle;
a battery status of the vehicle;
a maintenance history of the vehicle;
a geographical position of the vehicle;
current environmental conditions of the vehicle;
a current odometer reading of the vehicle;
the feedback about the vehicle fault;
a time stamp of the time of the input received via the input unit; or
a software version installed and executed in the vehicle or in the electrical and/or electronic vehicle components of the vehicle.

6. The method according to claim 4, wherein the backend is configured to evaluate the received snapshot.

* * * * *